Figure 1:
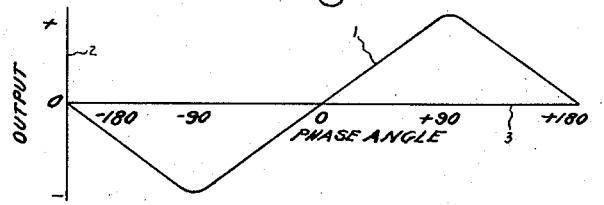

June 10, 1958     R. C. LONGFELLOW     2,838,733

PHASE DETECTION

Filed Oct. 15, 1951     2 Sheets-Sheet 1

Inventor:
Richard C. Longfellow,
by *Merton D Moose*
His Attorney.

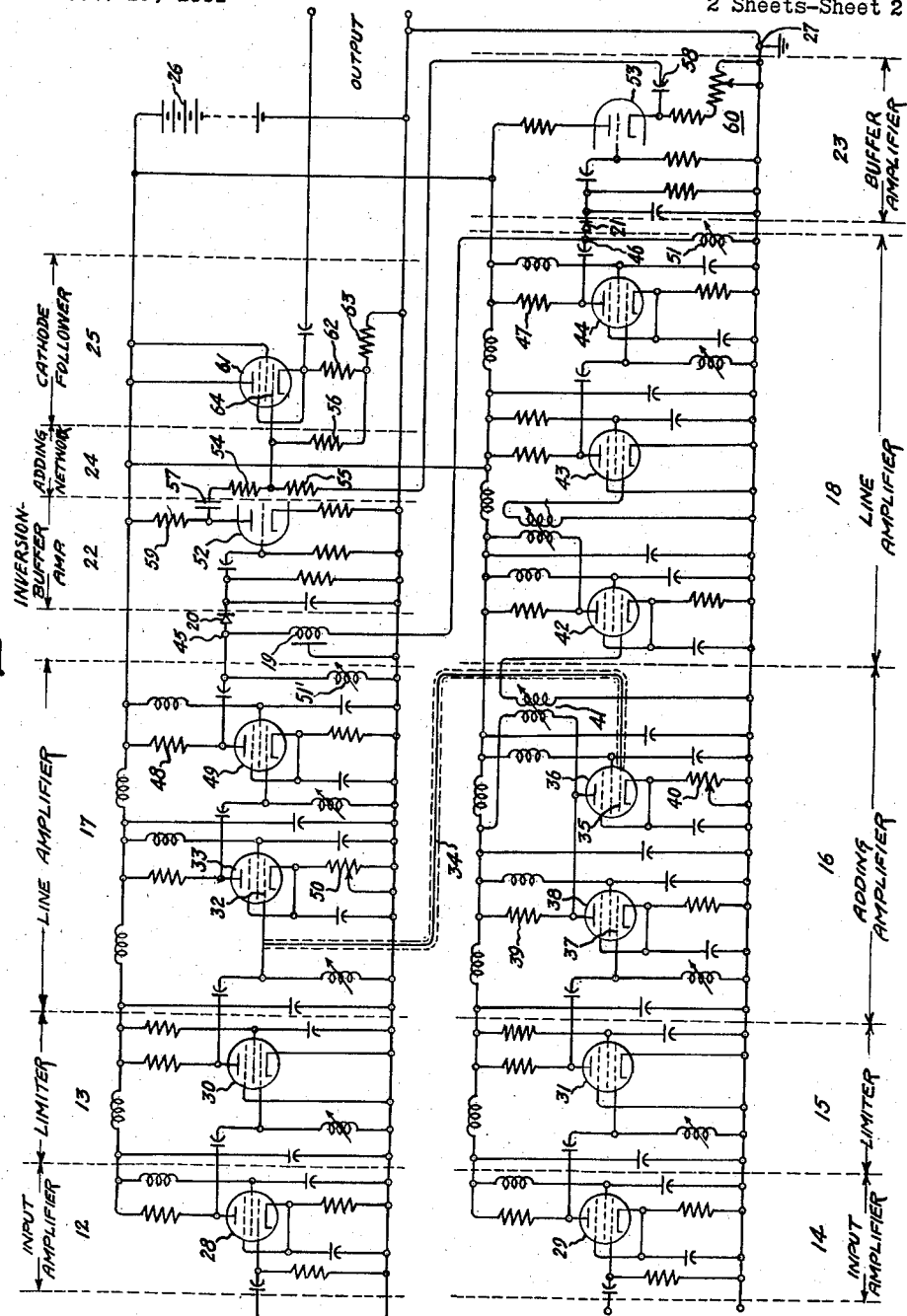

United States Patent Office 2,838,733
Patented June 10, 1958

2,838,733

PHASE DETECTION

Richard C. Longfellow, Elk River, Minn., assignor to General Electric Company, a corporation of New York Application October 15, 1951, Serial No. 251,419

11 Claims. (Cl. 324—83)

My invention relates to phase detection and, while not limited thereto, it has for one of its objects to provide an improved method and phase detector capable of detecting wide phase displacements between two waves, which phase displacements may be of any value within the range of three hundred and sixty degrees.

Frequently, in radar apparatus, for example, the indication of direction to a remote object is produced in response to the phase displacement between two pulsed carrier waves received from the object by reason of reflection of corresponding pulses radiated to the object. These pulsed waves may be received through different antennae and the arrangement is such that the phase displacement between them is a criterion of the direction of the object. This phase displacement may vary from zero to one hundred and eighty degrees in either direction or a total of 360 degrees.

An object of my invention is to provide a phase detector for producing a steadily and linearly varying unidirectional electromotive force varying from a maximum value of one polarity in response to one extreme of phase difference to a corresponding electromotive force of the opposite polarity in response to a phase difference of the opposite extreme, and in which said extremes may exceed one hundred and eighty degrees apart in phase and may closely approach three hundred and sixty degrees. With such a phase detector the entire range of phase difference existing between the carrier waves of the received pulses may be utilized to control the cathode ray indicator on which the direction indication is produced. It has been found that in this way a much improved indication on the cathode ray indicator can be obtained.

In carrying my invention into effect the two carrier wave electromotive forces the phase relation between which is to be compared, and which may be pulsed, are first combined to produce a resultant electromotive force. The phase difference between this resultant and one of the two carrier electromotive forces is then detected to produce a unidirectional electromotive force varying in magnitude in accord with the phase displacement existing between the respective carrier electromotive force and the resultant, said variation being from a maximum of one polarity corresponding to one extreme of the range to a maximum of the opposite polarity corresponding to the opposite extreme of the range.

A further object of my invention is to provide an improved method for detecting the phase difference between two signals.

A further object of my invention is to provide such a phase detector in which the variation in unidirectional output is linearly or proportionately, related to the variations in phase displacement to be determined.

The novel features which I believe to be characteristic of my invention are set forth with particularity in the appended claims. My invention itself, however, both as to its organization and method of operation together with further objects and advantages thereof may best be understood by reference to the following description taken in connection with the accompanying drawings in which Figs. 1 and 2 represent certain characteristics pertaining to the operation of my invention, Fig. 3 represents an embodiment of my invention, Fig. 4 represents a further embodiment of my invention, and Fig. 5 illustrates in detail apparatus embodying the form of my invention shown in Fig. 4.

Referring now to Fig. 1, there is shown a graph 1 representing the phase detection characteristic of a particular kind of prior art phase detector to be described below which may be utilized as a component of my invention. In this graph, the ordinate 2 represents voltage output from the phase detector and the abscissa 3 represents phase displacement or angle between the two applied electromotive forces. For example, if the two waves are in phase the output is zero. If one wave leads the other in phase the output is positive. If one wave lags the other in phase the output is negative.

Figure 2:
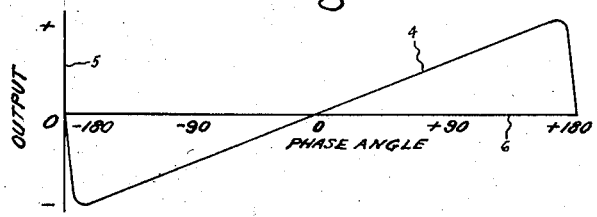

In Fig. 2 is shown a corresponding graph 4 of the phase detection characteristics of a phase detector constructed in accordance with my invention. In this graph the ordinate 5 similarly represents voltage output from the detector and the abscissa 6 represents phase angle. This graph shows that phase displacements of substantially plus or minus one hundred and eighty degrees between two waves may be detected by a phase detector employing my invention. This is substantially twice the maximum phase displacements detectable by the prior art phase detector referred to in the preceding paragraph.

Figure 3:
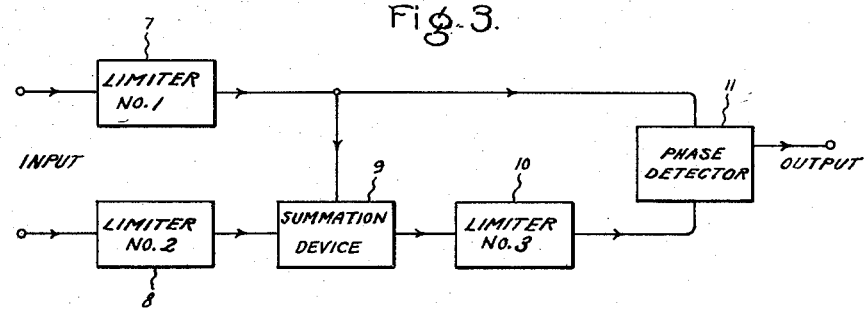
Figure 4:
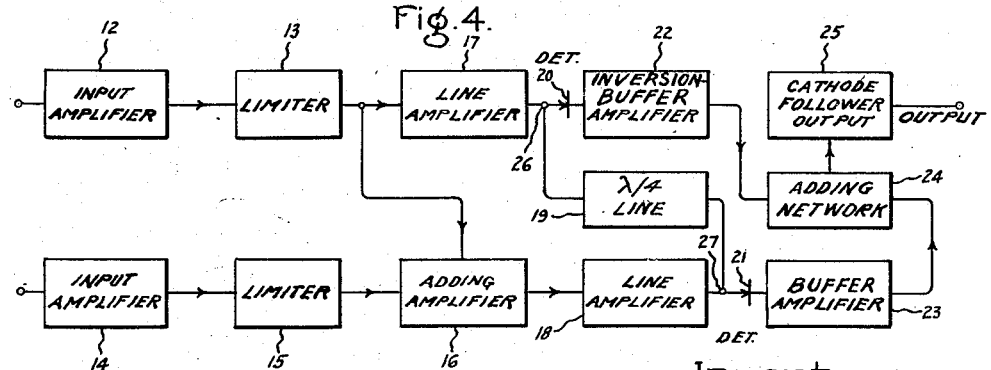

In Fig. 3, a block diagram is shown of apparatus constructed in accordance with my invention. In this block diagram the two carrier waves are supplied through limiters 7 and 8, respectively, to summation device 9. The limiters 7 and 8 limit the two waves as applied to device to equal values. The device 9 develops a sum wave lagging in phase one of said waves by the same amount it leads the other of said waves. The resultant wave from the summation device is supplied, preferably through a third limiter 10, to the phase detector 11. The third limiter 10 limits this wave as applied to the detector to substantially the same amplitude as the wave from the first limiter 7, which is also supplied to the phase detector. This phase detector 11, which may be of conventional construction, functions to develop an output voltage proportional to the phase displacement supplied thereto from limiters 7 and 10 between the two waves. The phase displacement between these two waves is one-half of the phase displacement of the incoming waves applied to the limiters 7 and 8. A conventional phase detector, having a phase characteristic of the kind shown in Figure 1, when connected with other elements as shown in Fig. 3 produces the resultant characteristic shown in Fig. 2. The use of limiter 10 produces a greater range of linearity in the over-all characteristic of the phase detector than would be obtained without it.

In Fig. 4 is shown a more detailed block diagram than that shown in Fig. 3 of an embodiment of my invention. Input amplifier 12 functions to amplify an incoming high frequency signal to a useable amplitude. Amplitude limiter 13 functions to limit the value of this amplitude to a particular value. Input amplifier 14 functions to amplify a second incoming wave to a useable amplitude. Limiter 15 functions to limit the amplitude of the second wave to the same magnitude to which the first wave is limited.

The adding amplifier 16 functions to add the first and second waves. Line amplifier 17 functions to amplify the first incoming wave to a suitable amplitude. Line amplifier 18 functions to amplify the resultant wave from the adding amplifier to a suitable amplitude, then to limit the amplitude of this wave to a particular value, and then further to amplify this wave to a suitable amplitude equal to the amplitude of the signal obtained from line amplifier 17. In effect line amplifiers 17 and 18 function to adjust the amplitude of the first wave and the amplitude of the sum wave to substantially the same values.

A one-quarter wave transmission line 19 suitably terminated in its characteristic impedance at both ends to eliminate reflections is connected between the output circuits of the line amplifiers 17 and 18 so that both waves properly phased may be applied to detectors 20 and 21.

The detector 20, which may be a suitable unilaterally conductive device, functions to detect the amplitude of the sum of the first wave and of the sum wave displaced ninety degrees in phase by the line 19 from its phase in the output circuit of line amplifier 18. Likewise, detector 21 functions to detect the amplitude of the sum of the sum wave and the first wave displaced in phase by ninety degrees from its phase in the output circuit of line amplifier 17.

Inversion-buffer amplifier 22 functions to amplify and invert the phase of the output electromotive force from detector 20. The buffer amplifier 23 functions to amplify the electromotive force from detector 21. Thus, the difference between the electromotive force from these detectors can be obtained when they are applied to the adding network 24. This difference is proportional to the phase displacement of the two waves applied to the input amplifiers 12 and 14. The polarity of this difference depends upon whether one wave is leading or lagging the other wave. The adding network 24 adds the detected electromotive forces from amplifiers 22 and 23. Cathode follower 25 functions to provide a low impedance output source for the electromotive force from the adding network 24.

The operation on the circuit shown in the block diagram of Fig. 4 will be apparent from a consideration of a particular example. Assume that pulsed high frequency electromagnetic waves are applied to the input amplifiers 12 and 14. These pulse waves will be limited in amplitude to the same value and then added in the adding amplifier 16. The wave from the output circuit of limiter 13 is displaced in phase from wave from the output circuit of the adding amplifier 16 by one-half the phase displacement of the waves applied to the input amplifiers 12 and 14. Line amplifiers 17 and 18 function to adjust the amplitudes of these latter two waves to substantially the same value.

Assume that the waves applied to input amplifiers 12 and 14 are slightly less than one-hundred and eighty degrees out-of-phase, and that the wave applied to input amplifier 12 is leading the wave applied to input amplifier 14. Then the wave appearing in the output circuit of line amplifier 17 is leading the wave appearing in the output circuit of line amplifier 18 by slightly less than ninety degrees. The output from amplifier 18 applied through quarter-wave transmission line 19 to point 26 lags the wave from the output of the line amplifier 17 by slightly less than one-hundred and eighty degrees. Accordingly, these waves substantially cancel and the output from detector 20 is nearly zero. The output from line amplifier 17 applied through quarter-wave transmission line 19 to point 27 is substantially in phase with the output from line amplifier 18. Accordingly, the detector 21 develops an output voltage nearly twice the output voltage developed had the signal from a single line amplifier been applied to it.

The voltage appearing in the output circuits of the detectors have the same polarity. Consequently, in order to obtain a voltage which is proportional to the difference of these voltages it is necessary to invert one of the two voltages from the detectors.

The voltage in the output circuit of one detector is applied to inversion buffer amplifier 22 and the voltage from the output circuit of the other detector is applied to buffer amplifier 23. The output voltages from the amplifiers 22 and 23 are applied to adding network 24 which produces a voltage having a particular polarity and magnitude. It should be recalled that since the waves are pulsed, this voltage is a pulse voltage having a particular amplitude.

If the phase of the wave applied to the input amplifier 14 leads the phase of the wave applied input amplifier 12 by slightly less than one-hundred and eighty degrees, the output from discriminator 20 is maximum and the output from crystal discriminator 21 is practically zero. The sum of the outputs is a pulse having a polarity opposite to the polarity of the preceding example.

Further, when the two waves are in phase, the outputs from crystal discriminators are equal in amplitude and accordingly zero output voltage is obtained from the adding network.

For phase departures of less than one-hundred and eighty degrees between the waves applied to the input amplifiers 12 and 14, the magnitudes of the pulse voltages obtained from the adding network vary accordingly, in polarity and in amplitude; that is, the greater the phase departure, the greater is the amplitude of the pulse output signal and the polarity of the output pulse will depend upon whether one wave is leading or lagging the other wave.

Fig. 5 illustrates in detail certain circuits which may be employed in the form of my invention illustrated in Fig. 4. In this figure the dotted lines designate portions of the circuits represented by rectangles in Fig. 4.

In this figure numerous electron discharge devices are employed, all of which are energized from a common source of operating potential 26, the negative terminal of which is grounded at 27 and connected to the cathodes of the various electron discharge devices directly, or through conventional bias resistors which in most instances are by-passed by conventional by-pass capacitors. The positive terminal of source 26 is connected to the anodes and screen electrodes of the respective electron discharge devices directly, or through appropriate impedances, as shown. The suppressor grid electrode of the various electron discharge devices are connected to the respective cathodes of these devices.

The two electromotive forces, the phase relation between which is to be determined, are applied respectively to the input circuits of the two electron discharge devices 28 and 29, respectively. The electromotive forces, amplified by these electron discharge devices, are then applied to limiters 30 and 31, respectively. These limiters function to limit the amplitude of electromotive forces appearing at the output circuits thereof to substantially the same amplitudes. These limiters, as shown in this figure, are of conventional design, each making use of a type 6BN6 tube.

The output from the limiter 30 is applied to the control electrode 32 of amplifier 33 and also through conductor 34, which may be appropriately shielded as indicated by dotted lines, to the control electrode 35 of amplifier 36. The output from limiter 31 is supplied to the control electrode 37 of amplifier 38.

These two amplifiers 36 and 38 comprise the adding amplifier 16 of Fig. 4. The anode of amplifier 38 and the anode of amplifier 36 are connected together and through load resistance 39 to the positive terminal of the source 26. A variable cathode resistance 40 is connected between the cathode of electron discharge device 36 and ground may be adjusted to equalize the gains of amplifiers 36 and 38 so that the resultant electromotive force appearing across anode resistance 39 will be the sum of electromotive forces of equal amplitude. The resultant voltage appearing across anode load resistance 39 is applied through transformer 41 to line amplifier 18 which comprises electron discharge devices 42, 43, 44 in cascade, electron discharge device 42 being connected to amplify the electromotive force supplied thereto, the electron discharge device 43 being connected like electron discharge devices 30 and 31 to limit the electromotive force to a suitable value, and amplifier 44 being appropriately connected to further amplify the electromotive force from the output circuit of device 43.

The output from amplifier 44 is supplied through quarter-wave delay line 19 to the terminal 45 where it is combined with the output of amplifier 49. The resulting electromotive force is detected by detector 20. At the same time this delay line transmits voltage from amplifier 49 to the terminal 46 at the output of amplifier 44 where it is combined with the voltage which appears at the output of the latter amplifier. The combination of these two voltages is detected by the detector 21.

A cathode resistance connected between the cathode of electron discharge device 33 may be varied to adjust the amplitude of the electromotive force at the output of amplifier 17 so that it equals the amplitude of electromotive force at the output of amplifier 18. By so adjusting the amplitude of the two waves a greater range of linearity in phase detection characteristics of phase detector is obtained.

The anode load resistances 47 and 48 of amplifiers 44 and 49, respectively, terminate the quarter-wave delay line 19 in the characteristic impedance of the line thereby minimizing reflections on this line, and thus, voltages in the output of line amplifiers 17 and 18 may both be applied between either terminal 45 or 46 and ground. Inductances 51 and 51' function to tune the respective ends of the delay line 19 and further minimize reflection of energy from either end of the line.

The output from detector 20 is amplified by immersion amplifier 52 and supplied to the adding network 24. Similarly, the output from detector 21 is applied to buffer amplifier 53 and then supplied to the adding network 24. This adding network comprises resistances 54, 55 and 56. Resistances 54 and 55 are connected in series between the anode of device 52 and the cathode of device 53 through coupling capacitors 57 and 58, respectively. Resistors 54 and 55 function to isolate the output circuit of amplifier 52 from the output circuit of amplifier 53. The anode of device 52 is connected to the positive terminal of source 26 through resistance 59 on which the voltage amplified by amplifier 52, and inverted in phase, appears. The cathode of device 53 is connected to ground through resistance 60 on which the voltage transmitted by amplifier 53 appears. These two voltages are added and the resultant appears between the point between resistances 54 and 55 and ground. The sum of these voltages appears across resistances 56 and 63 which are connected between the junction of resistances 54, 55 and ground.

As pointed out in connection with Fig. 4, the inversion amplifier 52 functions to invert the electromotive force applied to its input circuit in order that the difference may be taken between the electromotive forces appearing at the output circuits of detectors 20 and 21. A variable resistance 60 between the cathode of amplifier 53 and ground is adjusted to equalize the outputs of amplifiers 52 and 53. To obtain the desired proportional relationship between the phase of the applied input waves and the voltage output from the adding network, the voltage appearing between this point and ground is applied to the input circuit of cathode follower 61, the cathode of which is connected to ground through resistances 62 and 63. Resistance 56 is connected between control electrode 64 and the point between resistances 62 and 63. The cathode follower 25 functions to supply the desired signal from the adding network from a low impedance output circuit.

The various variable inductances and the primary and the secondaries of the transformers appearing in the circuits of Fig. 5 are tuned with respect to the distributed capacity appearing across their respective terminals to resonate at the frequency of the applied electromotive force. The various fixed inductances appearing in the power supply leads connected to the various positive electrodes of the electron discharge devices are decoupling or filtering inductances functioning to prevent conduction of electrical energy of the frequency of the applied electromotive force along these leads. Associated with these various inductances are filter capacitors which are connected in a conventional manner further to isolate the electron discharge devices and assure that conduction from one device to another is only along the desired circuit. Further, in order to keep spurious coupling between various electron discharge devices to a minimum, the discharge devices may be shielded from one another by the usual metallic shields.

While Figure 5 illustrates specific apparatus for carrying out the method illustrated in block diagram form by Figure 3, it is obvious that other apparatus for performing the functional steps of the method may be employed. For example, the summation device, 9 of Figure 3, may comprise well known resistance networks, diode adders, transformer circuit arrangements, etc., for performing the summation operation directly, or indirectly as by changing the sign of one of the signals and subtracting it from the other or by developing the signal $$\left(\frac{A}{B}+1\right)B$$

by an arrangement involving division and multiplication of the two input signals A and B, etc. The phase detection step may be performed by conventional resistance-capacitance discriminator networks, delay lines, gated beam tube phase detectors, etc. Finally the phase shifting step called for in the arrangement of Figure 4 may be performed by electrical delay lines, distributed or lumped, traveling wave amplifiers, transformers, etc.

While certain specific embodiments of my invention have been shown and described, it will, of course, be understood that various other modifications may be made without departing from the principles of the invention. It is, therefore, to be understood that the appended claims are intended to cover any such modifications which fall within the true spirit and scope of the invention.

What I claim as new and desire to secure by Letters Patent of the United States is:

1. The method of determining the phase relation between two undulating waves to derive the sum thereof which comprises directly adding said waves and measuring the relative phase difference between one of said waves and the sum of said waves.

2. A system for detecting the phase displacement of two undulating waves comprising means for adding said waves to derive undulating vector sum waves, and means for detecting the relative phase displacement between one of said two undulating waves and said undulating vector sum waves.

3. A system for detecting the phase displacement of two alternating electric waves comprising means for limiting said waves to substantially the same amplitudes, means for adding said limited waves to derive alternating vector sum waves, and means for measuring the phase difference between one of said limited waves and said vector sum waves.

4. Phase detection apparatus for detecting the phase relationship between two alternating electromotive forces comprising means for limiting the amplitudes of said electromotive forces to a predetermined ratio, means for adding said limited alternating electromotive forces to obtain a resultant alternating electromotive force, a phase detector for detecting the phase difference between one of said limited alternating electromotive forces and said resultant alternating electromotive force.

5. Phase detection apparatus for detecting the phase relationship between two undulating waves comprising means for limiting said undulating waves to amplitudes of the same order of magnitude, means for adding said limited waves to obtain an undulating resultant wave, and means for detecting the phase relation between one of said limited waves and said undulating resultant wave.

6. A phase detector for detecting the phase displacement between two undulating electric waves comprising means for equalizing the amplitudes of said waves to derive undulating equalized waves, means for adding said undulating equalized waves to obtain an undulating resultant wave, means responsive to the phase difference between one of said undulating equalized waves and said wave undulating resultant for producing an electromotive force varying continuously from a value corresponding to one extreme of phase difference between said first two waves and a value corresponding to the other extreme of phase difference between said first two waves.

7. Phase detection apparatus for detecting the relative phase displacement of two sinusoidal electrical waves comprising means for limiting said waves to amplitudes of the same magnitude to obtain sinusoidal limited waves, means for adding said limited waves to obtain an undulating resultant wave, a phase detector adapted to detect the relative phase of two waves, means for limiting the amplitude of the resultant wave to the same magnitude as one of said other waves, means for measuring the relative phase between one of said first limited waves and said limited resultant wave comprising means for applying said one of said first limited waves and said limited resultant wave to said phase detector.

8. Phase detection apparatus for detecting the phase displacement of two high frequency electrical waves comprising means for limiting said waves to substantially the same amplitudes, means for adding said limited waves to obtain a resultant wave, means for equalizing the amplitude of said resultant wave and one of said limited waves, and means for detecting the relative phase between said equalized one wave and said equalized resultant wave.

9. The method of determining the phase relation between two waves which comprises the steps of adding said two waves together to produce a resultant wave, shifting the phase of one of said two waves and said resultant wave each by the same amount to produce corresponding phase shifted waves, detecting the sum of one of said phase shifted waves and the other of said phase shifted waves before such phase shift and the sum of said other of said phase shifted waves and said one of said phase shifted waves before such phase shift to produce two respective electromotive forces, and combining said two electromotive forces in opposition.

10. The method for determining the phase relation between two alternating electrical signals which comprises directly vectorially adding said signals to derive alternating vector sum signals, and measuring the relative phase difference between one of said electrical signals and said vector sum signals.

11. The method for determining the phase relation between two alternating electrical signals which comprises limiting the magnitude of each of said signals to the same level to obtain alternating limited signals, vectorially adding said limited signals to derive alternating vector sum signals, and detecting the relative phase difference between one of said electrical signals and said vector sum signals.

References Cited in the file of this patent
UNITED STATES PATENTS

| | | |
|---|---|---|
| 2,225,348 | Mikelson | Dec. 17, 1940 |
| 2,513,477 | Gubin | July 4, 1950 |
| 2,517,805 | Spindler | Aug. 8, 1950 |
| 2,640,939 | Staschover et al. | June 2, 1953 |

FOREIGN PATENTS

| | | |
|---|---|---|
| 839,224 | France | Dec. 26, 1938 |

OTHER REFERENCES

"An electron phasemeter," article by Florman and Tait, Proceedings of I. R. E., vol. 37, No. 2, February 1949.

U. S. DEPARTMENT OF COMMERCE

PATENT OFFICE

CERTIFICATE OF CORRECTION

Patent No. 2,838,733     Richard C. Longfellow          June 10, 1958

It is hereby certified that error appears in the printed specification of the above numbered patent requiring correction and that the said Letters Patent should read as corrected below.

Column 7, line 10, for "wave undulating resultant" read -- undulating resultant wave --.

Signed and sealed this 5th day of August 1958.

(SEAL)

Attest:

KARL H. AXLINE

Attesting Officer

ROBERT C. WATSON
Commissioner of Patents